2 Sheets. Sheet. 1.

W. H. Fruen,

Liquid Meter.

No. 107,607. Patented Sep. 20. 1870.

Witnesses.
Edward Griffiths
Geo. N. Soring

William Henry Fruen.
by his Attorney
Frederick Curtis.

W. H. Fruen,

Liquid Meter

No. 107,607. Patented Sep. 20, 1870.

2 Sheets. Sheet 2.

Section of cylinder.

Plan of cylinder.

Witnesses.
E. Griffith
Geo. A. Loring.

William Henry Fruen
by his Attorney
Frederick Curtis.

United States Patent Office.

WILLIAM HENRY FRUEN, OF BOSTON, MASSACHUSETTS.

Letters Patent No. 107,607, dated September 20, 1870.

IMPROVEMENT IN LIQUID-METERS.

The Schedule referred to in these Letters Patent and making part of the same.

*To all to whom these presents shall come:*

Be it known that I, WILLIAM HENRY FRUEN, a native of England, in the kingdom of Great Britain, at present residing in Boston, in the county of Suffolk and State of Massachusetts, have made an invention of a novel and useful Liquid-Meter, or instrument for determining and registering the amount of a flowing liquid.

Figure 1:
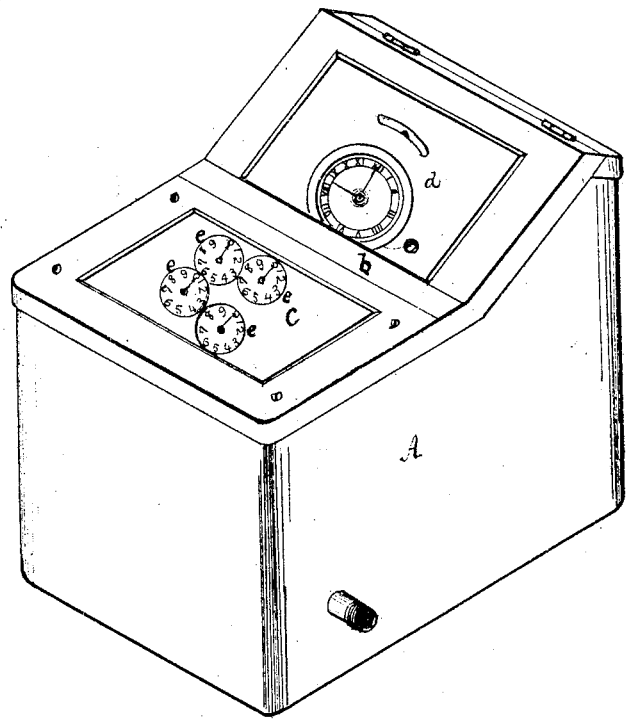

Figure 1 is a perspective view; and

Figure 2:
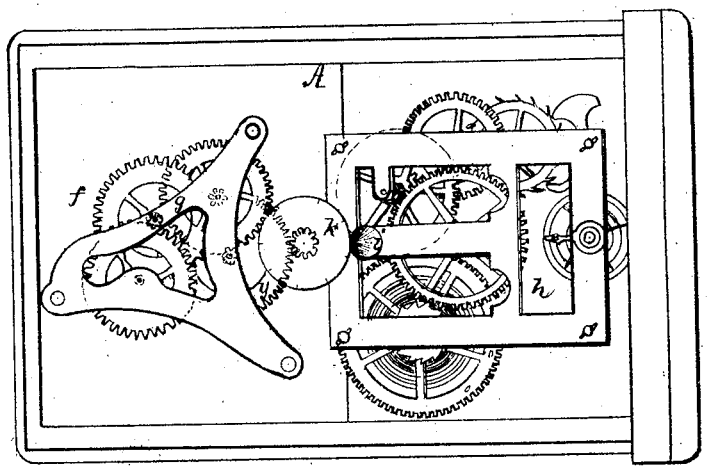
Figure 3:
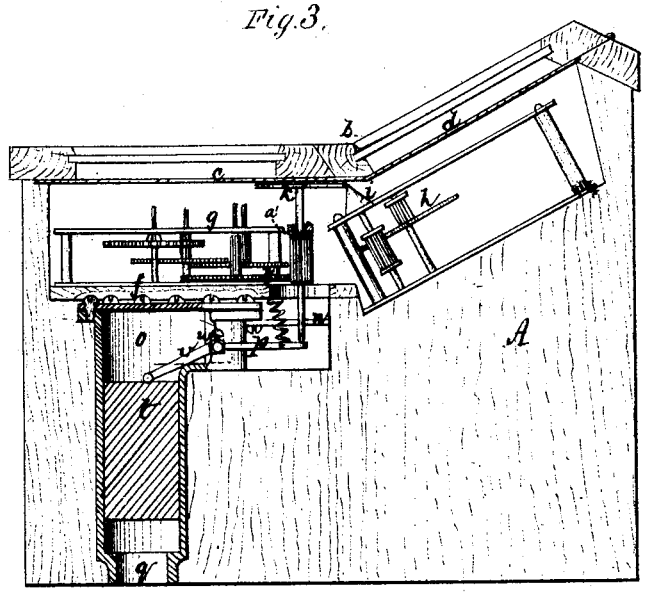
Figure 4:
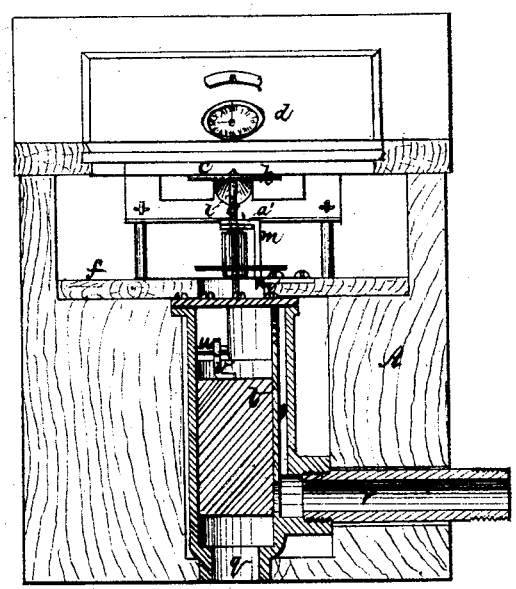
Figure 4:
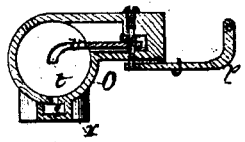
Figure 4:
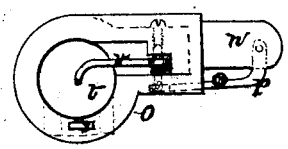

Figure 2, an interior plan of an instrument embodying my invention;

Figures 3 and 4 being vertical sections of the same, taken in opposite directions through it.

Detailed views of the invention will be duly referred to.

The object aimed at in originating this invention is to produce an instrument capable of performing the functions, as above prefaced, in a perfectly accurate manner, and one which may be manufactured at low cost.

I have combined in this instrument an indicating mechanism to register the amount of liquid flowing through it; a clock-escapement, or its equivalent, to maintain such registering mechanism in action, and a piston and plunger, with intermediate instrumentalities, by means of which the rapidity of motion of the indicating mechanism is varied in direct correspondence with the amount of liquid which the instrument delivers, the whole being as hereinafter explained.

Description of Mechanism.

In the drawing accompanying and illustrating my invention—

A denotes a cubical or rectangular box or encasement, having a transparent cover or window, *b*, and beneath such cover an indicating-face or register, *c*, upon one-half of which an ordinary clock-dial, *d*, is painted, while upon the adjacent half are disposed four circular scales, *e e e e*, each numbering from one to ten, and belonging to the indicating mechanism, which is situated below them, and which will be hereinafter referred to.

Within the box A, and near its upper part, a horizontal partition or floor, *f*, is fixed, while upon this floor, and below the registering-scales *e e*, &c., before mentioned, is placed the indicating and registering mechanism *g*, and which consists of a train of four gears and pinions, mounted within a suitable frame, and upon upright arbors, the upper extremities of which pass through the plate *c*, before mentioned, and concentric with the scales *e e*, &c., and are provided with suitable index-pointers or hands, to operate with such scale.

Upon the opposite side of the floor *f*, and below the clock-dial or face *d*, I dispose a clock-escapement or movement, *h*, of any suitable construction, the hands of such clock-movement operating in connection with the dial *d* to denote the time in the ordinary manner.

As the registering mechanism before mentioned is substantially the same as that now universally adopted in gas-meters, and as it is adopted in the present instance merely for the purpose of showing a means of denoting the results of the instruments, a minute description of it is not considered necessary.

The same may be said with regard to the clock-escapement, which is of ordinary construction, with the exception that, in place of the indicator or hand ordinarily applied to the second-hand shaft, I affix a conical revolving block, *i*, or pulley, the periphery of which impinges against that of a horizontal revolving disk, *k*, disposed alongside of it, and mounted upon the upper end of a vertical shaft, *l*, such shaft being supported and revolving in bearings or brackets *m n*, the former of which is erected upon the floor *f*, and the latter affixed to one side of a perpendicular cylinder disposed below the said floor, in manner as will be duly explained, the shaft *l* and the disk *k* being susceptible of free vertical sliding movements to and fro with respect to the conical pulley *i*, and with the lower extremity of the shaft *l*, when in its lowest position, resting upon or standing directly over the free end of a tilting-lever, *p*, fulcrumed to one side of the cylinder *o*, above alluded to. This cylinder *o* depends from or is disposed below the floor *f*, and to one side of the shaft *l*, before mentioned, as shown in fig. 3 of the accompanying drawing.

This cylinder is tightly closed at top, and is open at bottom, where it is formed with an induction-port, *q*, for the entrance of liquid to its interior, the cylinder being further formed with a lateral eduction-port, *r*, disposed immediately above the entrance-port *q*, a pipe being connected with such port *r*, and conducted to any desired locality.

In addition to the eduction-port *r*, an upright channel or port, *s*, is formed in the side wall of the cylinder *o*, such channel opening communication between the said eduction-port *r* and the upper part of the cylinder.

*t*, in the drawing, represents a plunger or piston, disposed and sliding within the bore of the cylinder, and being in length equal to about one-third such bore.

Disposed within the upper part of the cylinder *o* will be seen a swinging arm or lever, *v*, the free end of which is situated immediately over the plunger *t*, while its opposite end is fixed to the fulcrum *w* of the lever *p*, before mentioned, the disposition of the two levers or arms, *v* and *p*, and their common fulcrum, being such that an elevation of the free end of the former effects a corresponding descent of that of the latter, and, consequently a lowering of the shaft $l$ and the disk $k$.

A coiled spring is attached at one end to the vibrating end of the lever $p$, while its opposite end is made fast to the bracket $m$, before mentioned, or to the floor of the case A in such manner as to maintain the lever $v$ in contact with the piston $t$, and compelling it to follow the vertical movements of such plunger.

$k$ denotes a long pinion, fixed to the shaft $l$ and meshing into the lowest gear $y$ of the indicating mechanism, the length of the pinion with respect to such gear being such as to insure the contact of the two under the extreme vertical movements of the former.

Operation of the Instrument.

The above constitutes the mechanical construction of an instrument embodying the principles of my invention, and details of such mechanism may be varied to a considerable extent without departing from the spirit of such invention.

The operation of the above-described instrument is as follows:

Water, at any desired pressure, is admitted to the cylinder $o$ through its induction-port $q$, and, impinging against the plunger $t$, elevates the same, and, by uncovering a portion of the outlet-orifice $r$, opens for itself a means of escape.

A portion of the in-rushing fluid forces its way upward through the channel $s$, and over and upon the top of the plunger, thus poising the latter within the cylinder $o$, or the liquid contained therein, it being understood that the only pressure subtracted from that originally possessed by the fluid is an amount sufficient to float the plunger $t$, which is very slight.

Although I have stated that the portion of the in-rushing fluid which flows upward through the channel $s$ into the upper part of the cylinder and upon the top of the plunger, will exert a pressure upon the latter equal to that exerted from below, minus the amount required to poise such plunger, it is apparent that such a construction of parts might exist as to diminish the pressure upon the top of the plunger, such pressure lessening in proportion to the quantity of fluid passing into and through the instrument.

It is important that this latter condition should be avoided as far as possible, in order to effect a perfectly-accurate working of the meter under all conditions of service.

Although the fact will be self-evident, I would state that the greater the amount of liquid entering the instrument through the port $q$ and leaving by the port $r$, the greater will be the elevation of the plunger $t$. As an elevation of the plunger, by means before stated, effects a lowering of the free end of the lever $p$, and, consequently, of the shaft $l$ and disk $k$, which rests upon it, it results that, with an increased elevation of the piston, an increased rapidity of revolution is imparted to the said disk, owing to the fact that it approaches the largest diameter of the conical pulley $i$, which drives it, it being observed that the relative position of the plunger $t$, the levers $v$ and $p$, the shaft $l$, disk $k$, and cone $i$, are such that, when water is shut out from the instrument altogether, and the plunger rests at the bottom of the cylinder, the perimeter of the disk $k$ stands at the apex of the cone and uninfluenced by it, although the latter is in constant revolution, and it is only when fluid is admitted to the instrument, although in minute quantities, that the disk commences its revolution at the hands of the cone. It remains, therefore, for us to calculate the size of the outlet-port $r$, and the comparative circumference of the disk $k$ and cone $i$, and the relation of such parts to the indicating mechanism, in such manner as to obtain the proper results, for the reason that the said cone, making one revolution per minute, governs, through the agency of the disk $k$ and its adjuncts, the speed with which the registering mechanism travels, and effects the proper registering of the liquid which leaves the instrument per minute.

As the pulsations of the piston, due to the various quantities of water admitted to the cylinder, are always identical in their relations to such variable amount, a given quantity of liquid passing through the instrument will always effect a like elevation of the piston, and proper relative positions of the disk $k$ and cone $i$, and through them the speed with which the indicating mechanism travels.

It will be observed, by referring to the drawing, that the bearing within the bracket $m$, which in part supports the shaft $l$, is of somewhat larger area than the greater portion of such shaft which is forced in contact with that side of the bearing which is nearest the cone $i$ by a plate-spring, $a'$, applied to an adjacent part of the bracket, and which presses against it, this spring also serving the purpose of maintaining the contact of the disk $k$ and cone $i$.

The shaft $l$, for a short distance immediately above its pinion $b$, is conical or tapering, the disposition of the tapering portion of the shaft with respect to the cone $i$ being such that, as fluid is shut out from entrance to the instrument, and the plunger $t$ falls to its lowest point, the tapering portion of the shaft shall force the disk $k$ away from the apex of the cone, in order to prevent any rotation of such disk or action of the registering device.

An instrument constructed as above explained possesses the advantages of extreme low cost, of unerring accuracy, and of durability.

The power required to drive the mechanism of my meter is removed from the liquid which such meter is to measure, and is transferred to another and independent motor, thus enabling me to economize to a great extent and preserve the original pressure of the fluid.

The cost of the clock-escapement in one sense cannot be said to be entirely expended upon the meter, since, in connection with the dial-face $d$, it performs the functions of a clock, and, in this respect, is of considerable service, irrespective of its duties of driving the registering mechanism, and converts the instrument into a combined meter and clock.

Having thus described the nature, purposes, and advantages of my invention,

What I claim to be original with myself, and desire to secure by Letters Patent of the United States is as follows:

Claims.

1. The combination and arrangement of the cylinder $o$, plunger $t$, arms or levers $p$ and $v$, mounted as explained, and the ports or ducts $q$, $r$, and $s$, operating together and in combination with the other features of the instrument, as before explained.

2. The construction of the shaft $l$ in its relation to the cam $i$, whereby its tapering portion, before mentioned, deflects the disk $k$ from the apex of said cone, in order that the functions of the registering device shall terminate with cessation of flowage of liquid through the instrument.

3. A liquid-meter, in which registering mechanism, the clock-work for imparting movement to the same, and the piston or plunger, with the ports or ducts for the passage of the water, and the devices for varying the movement transmitted from the clock-work to the registering mechanism, are constructed and combined together, and arranged within the meter-case A, in the manner shown and described.

WILLIAM HENRY FRUEN.

Witnesses:
 FRED. CURTIS,
 E. GRIFFITH.